United States Patent
Reiley et al.

(10) Patent No.: US 11,914,381 B1
(45) Date of Patent: *Feb. 27, 2024

(54) METHODS FOR COMMUNICATING STATE, INTENT, AND CONTEXT OF AN AUTONOMOUS VEHICLE

(71) Applicant: Direct Current Capital LLC, Wilmington, DE (US)

(72) Inventors: Carol Reiley, Mountain View, CA (US); Daniel Espinel, Mountain View, CA (US); Ryan Wistort, Mountain View, CA (US); Michael Paris, Mountain View, CA (US)

(*) Notice: Subject to any disclaimer, the term of this patent is extended or adjusted under 35 U.S.C. 154(b) by 35 days.

This patent is subject to a terminal disclaimer.

(21) Appl. No.: 17/380,681

(22) Filed: Jul. 20, 2021

Related U.S. Application Data

(63) Continuation of application No. 16/286,294, filed on Feb. 26, 2019, now Pat. No. 11,079,765, which is a (Continued)

(51) Int. Cl.
*B60Q 1/26* (2006.01)
*G05D 1/00* (2006.01)
(Continued)

(52) U.S. Cl.
CPC ............ *G05D 1/0214* (2013.01); *B60Q 1/26* (2013.01); *B60Q 1/46* (2013.01); *B60Q 1/5035* (2022.05);
(Continued)

(58) Field of Classification Search
CPC .. G05D 1/0214; G05D 1/0061; G05D 1/0246; G05D 2201/0213; B60Q 5/006;
(Continued)

(56) References Cited

U.S. PATENT DOCUMENTS 2,190,123 A 2/1940 Pace
7,095,318 B1 8/2006 Bekhor
(Continued)

FOREIGN PATENT DOCUMENTS

EP 1912157 4/2008

OTHER PUBLICATIONS

Miyasaka et al., Ego-motion estimation and moving object tracking using multi-layer LIDAR, 2009, IEEE, p. 151-156 (Year: 2009).*
(Continued)

*Primary Examiner* — McDieunel Marc
(74) *Attorney, Agent, or Firm* — Polsinelli PC

(57) ABSTRACT

One variation of a method for communicating state, intent, and context of an autonomous vehicle includes: at a first time, displaying a first icon representing a current state of a vehicle on a rear-facing visual display arranged on the vehicle; navigating toward an intersection; at a second time, detecting a state of the intersection ahead of the vehicle; rendering a second icon representing the state of the intersection at the second time on the rear-facing visual display; detecting a change in the state of the intersection at a third time succeeding the second time; selecting a next navigation action for the vehicle responsive to the change in the state of the intersection at the third time; prior to executing the next navigation action, rendering a third icon representing the next navigation action on the rear-facing visual display; and autonomously executing the next navigation action.

22 Claims, 5 Drawing Sheets

Related U.S. Application Data continuation of application No. 15/384,033, filed on Dec. 19, 2016, now Pat. No. 10,261,513.

(51) Int. Cl.
  *B60Q 1/50* (2006.01)
  *B60Q 5/00* (2006.01)
  *B60Q 1/46* (2006.01)

(52) U.S. Cl.
  CPC ............ *B60Q 1/525* (2013.01); *B60Q 5/006* (2013.01); *G05D 1/0061* (2013.01); *G05D 1/0246* (2013.01); *G05D 2201/0213* (2013.01)

(58) Field of Classification Search
  CPC .......... B60Q 1/503; B60Q 1/26; B60Q 1/525; B60Q 1/46; B60Q 1/50
  See application file for complete search history.

(56) References Cited

U.S. PATENT DOCUMENTS

| | | | |
|---|---|---|---|
| 7,844,394 | B2 | 11/2010 | Kim |
| 7,647,180 | B2 | 12/2010 | Breed |
| 7,924,146 | B2 | 4/2011 | Seder et al. |
| 8,269,652 | B2 | 9/2012 | Seder et al. |
| 8,514,100 | B2 | 8/2013 | Yamashita |
| 8,849,494 | B1 | 9/2014 | Herbach |
| 8,996,224 | B1 | 3/2015 | Herbach |
| 9,196,164 | B1 | 11/2015 | Urmson et al. |
| 9,336,436 | B1 | 5/2016 | Dowdall |
| 9,428,186 | B2 | 8/2016 | Breed |
| 9,535,423 | B1 | 1/2017 | Debreczeni |
| 9,654,738 | B1 | 5/2017 | Ferguson |
| 9,718,405 | B1 | 8/2017 | Englander et al. |
| 9,829,889 | B1 | 11/2017 | Kusano et al. |
| 9,849,784 | B1 | 12/2017 | Chan |
| 9,870,703 | B2 | 1/2018 | MacNeille et al. |
| 9,881,503 | B1 | 1/2018 | Goldman-Shenhar et al. |
| 9,884,585 | B1 | 2/2018 | Lubbers |
| 9,902,311 | B2 | 2/2018 | Sweeney |
| 9,954,252 | B2 | 4/2018 | Ogihara et al. |
| 9,994,148 | B1 | 6/2018 | Kim |
| 10,053,001 | B1 | 8/2018 | Nabbe et al. |
| 10,118,548 | B1 | 11/2018 | Fields et al. |
| 10,134,280 | B1 | 11/2018 | You |
| 10,196,058 | B2 | 2/2019 | Paris et al. |
| 10,261,513 | B2 | 4/2019 | Reiley et al. |
| 10,262,528 | B2 | 4/2019 | Fields et al. |
| 10,317,907 | B2 | 6/2019 | Shami |
| 10,889,295 | B2 | 1/2021 | Paris et al. |
| 11,079,765 | B2* | 8/2021 | Reiley .................. G05D 1/0214 |
| 2003/0023370 | A1 | 1/2003 | Millington et al. |
| 2003/0147247 | A1 | 8/2003 | Koike |
| 2004/0193347 | A1 | 9/2004 | Harumoto |
| 2005/0117364 | A1 | 6/2005 | Rennick et al. |
| 2007/0277100 | A1 | 11/2007 | Sheha et al. |
| 2008/0161986 | A1 | 7/2008 | Breed |
| 2009/0069977 | A1 | 3/2009 | Markyvech |
| 2010/0082251 | A1 | 4/2010 | Kogure |
| 2010/0328055 | A1 | 12/2010 | Fong et al. |
| 2011/0046835 | A1 | 2/2011 | Taguchi |
| 2011/0090093 | A1 | 4/2011 | Grimm et al. |
| 2011/0184617 | A1 | 7/2011 | Hegemann et al. |
| 2011/0199199 | A1 | 8/2011 | Perkins |
| 2011/0234422 | A1 | 9/2011 | Yamashita |
| 2012/0083960 | A1 | 4/2012 | Zhu et al. |
| 2012/0179280 | A1 | 7/2012 | Faye |
| 2012/0242479 | A1 | 9/2012 | Ghazarian et al. |
| 2012/0310465 | A1 | 12/2012 | Boatright et al. |
| 2013/0265791 | A1 | 10/2013 | Dassanayake et al. |
| 2013/0345900 | A1 | 12/2013 | Usui |
| 2014/0180914 | A1* | 6/2014 | Abhyanker ............ G05D 1/102 705/332 |
| 2014/0268353 | A1 | 9/2014 | Fujimura et al. |
| 2014/0324266 | A1* | 10/2014 | Zhu ........................ G01S 13/865 382/104 |
| 2014/0333468 | A1* | 11/2014 | Zhu ........................ G01S 13/867 342/54 |
| 2014/0365126 | A1 | 12/2014 | Vulcano et al. |
| 2015/0066284 | A1 | 3/2015 | Yopp |
| 2015/0151725 | A1 | 6/2015 | Clarke et al. |
| 2015/0183430 | A1 | 7/2015 | Schwindt et al. |
| 2015/0202770 | A1* | 7/2015 | Patron ................ G06Q 30/0265 901/50 |
| 2015/0332114 | A1 | 11/2015 | Springer |
| 2015/0336502 | A1 | 11/2015 | Hillis et al. |
| 2016/0003636 | A1 | 1/2016 | Ng-Thow-Hing |
| 2016/0012813 | A1 | 1/2016 | Every et al. |
| 2016/0040997 | A1 | 2/2016 | Otani |
| 2016/0061613 | A1 | 3/2016 | Jung et al. |
| 2016/0068099 | A1 | 3/2016 | Peterson et al. |
| 2016/0207443 | A1 | 7/2016 | Widdowson et al. |
| 2016/0231746 | A1 | 8/2016 | Hazelton et al. |
| 2016/0355179 | A1 | 12/2016 | Cannella et al. |
| 2016/0355192 | A1 | 12/2016 | James |
| 2016/0375900 | A1 | 12/2016 | Laur et al. |
| 2017/0193384 | A1 | 7/2017 | Mudalige et al. |
| 2017/0217368 | A1 | 8/2017 | Lewis |
| 2017/0240096 | A1 | 8/2017 | Ross |
| 2017/0240098 | A1 | 8/2017 | Sweeney et al. |
| 2017/0243490 | A1 | 8/2017 | Leppanen et al. |
| 2017/0270374 | A1 | 9/2017 | Myers et al. |
| 2017/0277192 | A1 | 9/2017 | Gupta et al. |
| 2018/0072218 | A1 | 3/2018 | Sweeney |
| 2018/0075309 | A1 | 3/2018 | Sathyanarayana et al. |
| 2018/0173237 | A1 | 6/2018 | Reiley et al. |
| 2018/0194280 | A1 | 7/2018 | Shibata et al. |
| 2018/0276986 | A1 | 9/2018 | Delp |
| 2018/0286232 | A1 | 10/2018 | Shau |
| 2018/0329418 | A1 | 11/2018 | Baalke et al. |
| 2018/0334089 | A1 | 11/2018 | Huang et al. |
| 2019/0118810 | A1 | 4/2019 | Paris et al. |
| 2019/0265703 | A1 | 8/2019 | Hicok et al. |
| 2020/0001779 | A1 | 1/2020 | Alexander |
| 2020/0005645 | A1 | 1/2020 | Wray et al. |
| 2020/0017106 | A1 | 1/2020 | Park |
| 2020/0114812 | A1 | 4/2020 | Imaishi et al. |
| 2020/0114813 | A1 | 4/2020 | Lujan et al. |
| 2020/0184278 | A1 | 6/2020 | Zadeh et al. |
| 2021/0206369 | A1 | 7/2021 | Paris et al. |

OTHER PUBLICATIONS

Ducrocq et al., A visual attention focusing system using an active stereoscopic vision sensor, 2010, IEEE, p. 1-6 (Year: 2010).*

Pears, An intelligent active range sensor for vehicle guidance: system overview, 1996, IEEE, p. 81-88 (Year: 1996).*

Wang et al., Multimodal Temporal Panorama for Moving Vehicle Detection and Reconstruction, 2011, IEEE, p. 571-576 (Year: 2011).*

"Nissan IDS Concept: Nissan's vision for the future of EVs and autonomous driving," Oct. 27, 2015, http://nissannews.com/en-US/nissan/usa/releases/nissan-ids-concept-nissan-s-vision-for-the-future-of-evs-and-autonomous-driving, accessed Sep. 14, 2016.

Trivedi et al., Holistic Sensing and Active Displays for Intelligent Diver Support Systems, 2007, IEEE, p. 60-68.

Ng-Thow-Hing et al., User-centered perspectives for automotive augmented realtiy, 2013, IEEE, p. 13-22.

Mueller et al., "Object-related-navigation for mobile robots," 2012, IEEE, p. 603-610.

Wang et al., "Steering behaviors for autonomous vehicles in virtual environments," 2005, IEEE, p. 155-162.

Willemesen et al., "Ribbon networks for modeling navigable paths of autonomous agents in virtual environments," 2006, IEEE, p. 331-342.

Sotelo et al., "Vision-based navigation system for autonomous urban transport vehicles in outdoor environments," 2002, IEEE, p. 52-57.

Waxman et al., "A visual navigation system for autonomous land vehicles," 1987, IEEE, p. 124-141.

(56) References Cited

OTHER PUBLICATIONS

O'Malley et al., "Rear-Lamp Vehicle Detection and Tracking in Low-Exposure Color Video for Night Conditions," *IEEE Transactions on Intelligent Transportation Systems*, vol. 11, No. 2, Jun. 2010, pp. 453-462.

\* cited by examiner

METHODS FOR COMMUNICATING STATE, INTENT, AND CONTEXT OF AN AUTONOMOUS VEHICLE

CROSS-REFERENCE TO RELATED APPLICATIONS

This Application is a continuation of U.S. patent application Ser. No. 16/286,294, filed on Feb. 26, 2019 and entitled "METHODS FOR COMMUNICATING STATE, INTENT, AND CONTEXT OF AN AUTONOMOUS VEHICLE," which is a continuation of U.S. patent application Ser. No. 15/384,033, filed on Dec. 19, 2016 and entitled "METHODS FOR COMMUNICATING STATE, INTENT, AND CONTEXT OF AN AUTONOMOUS VEHICLE." Each of these applications is incorporated by reference in its entirety herein.

TECHNICAL FIELD

This invention relates generally to the field of autonomous vehicles and more specifically to a new and useful methods for communicating state, intent, and context of an autonomous vehicle in the field of autonomous vehicles.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
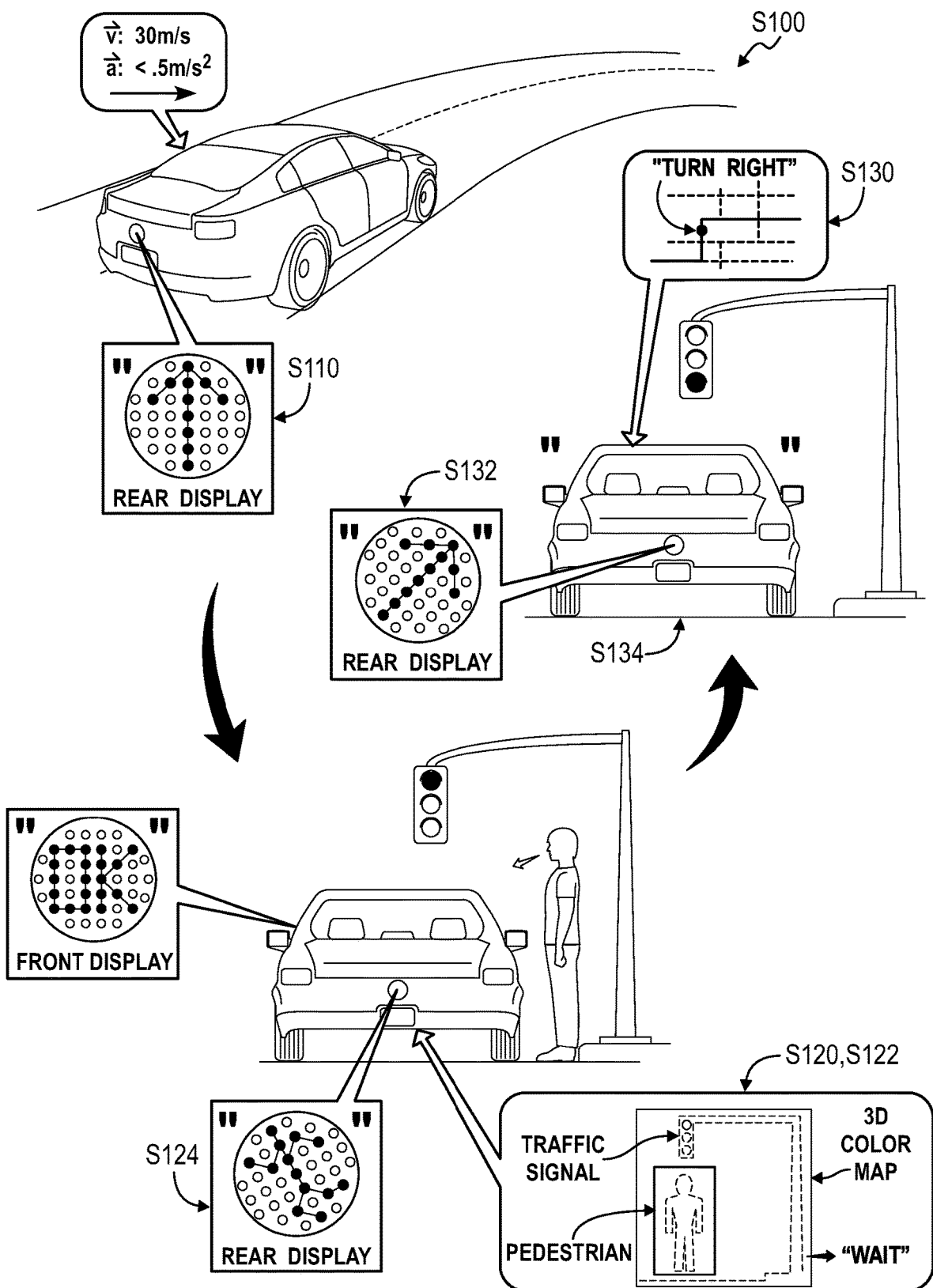
FIG. 1 is a flowchart representation of a method.

As shown in FIG. 1, a method S100 for communicating state, intent, and context of an autonomous vehicle includes: at a first time, rendering a first representation of a current state of the vehicle on a rear-facing visual display arranged on the vehicle in Block S110; during a second period of time succeeding the first time, detecting proximity of the vehicle to an intersection in Block S120, detecting a current state of the intersection ahead of the vehicle in Block S122, and rendering a second representation of the current state of the intersection on the rear-facing visual display in Block S124; and, during a third period of time, selecting a next navigation action for the vehicle in Block S130 in response to detecting a change in the state of the intersection, rendering a third representation of the next navigation action on the rear-facing visual display in Block S132 in preparation for autonomously executing the next navigation action, and autonomously executing the next navigation action in Block S134.

One variation of the method includes: at a first time, displaying a first icon representing a current state of the vehicle on a rear-facing visual display arranged on the vehicle in Block S110; navigating toward an intersection in Block S120; at a second time succeeding the first time, detecting a state of the intersection ahead of the vehicle in Block S122; rendering a second icon representing the state of the intersection at the second time on the rear-facing visual display in Block S124; detecting a change in the state of the intersection at a third time succeeding the second time in Block S130; selecting a next navigation action for the vehicle responsive to the change in the state of the intersection at the third time in Block S130; prior to autonomously executing the next navigation action, rendering a third icon representing the next navigation action on the rear-facing visual display in Block S132; and at a fourth time succeeding the third time, autonomously executing the next navigation action in Block S134

2. Applications

Generally, the method S100 can be executed by an autonomous road vehicle (hereinafter "autonomous vehicle") to visually communicate: its current state, such as while in motion, in Block S110; and its next state, such as turning right at an intersection, in Blocks S130, S132, and S130; a state of a scene ahead of the autonomous vehicle, such as while stopped at an intersection, in Blocks S120, S122, and S124 to drivers and other road vehicles behind the autonomous vehicle. In particular, the autonomous vehicle can execute Blocks of the method S100 automatically during operation (i.e., while navigating along a roadway) in order to visually communicate most relevant information about its current state, its future state, and a scene nearby (e.g., ahead) to other drivers and (autonomous) vehicles nearby.

For example, while the autonomous vehicle is in motion and moving along a roadway with other drivers, these other drivers and vehicles may have visual access to the roadway and to objects and other vehicles ahead; the autonomous vehicle can thus communicate its current state, such as whether it is in a fully-autonomous or a fully-manual mode, through its rear-facing display in Block S110 in order to better enable these other drivers and vehicles to predict the autonomous vehicle's current and future motion. In this example, when preparing to change its motion or current state, such as transitioning into fully-autonomous mode or making a right-hand turn, the autonomous vehicle can automatically signal this state change to other drivers and vehicles nearby in Blocks S130, S132, and S134. However, in some instances, the state of a roadway ahead, such as an intersection, may be less visually accessible but more valuable to drivers and other vehicles behind the autonomous vehicle when deciding on a subsequent action; the autonomous vehicle can therefore scan the roadway ahead, detect a state of the roadway from information extracted from this scan, and represent this state of the roadway visually on its rear-facing display in Blocks S120, S122, and S124. The autonomous vehicle can implement similar methods and techniques to process scan data broadcast from other vehicles and/or static sensor systems nearby—such as a distance sensor and an imaging sensor arranged on a traffic signal—and to update data rendered on its display(s) accordingly.

The autonomous vehicle can transition between these states—including rendering its current state in Block S110, rendering its next or future state in Block S132, and rendering a state of a nearby roadway in Block S124—based on various triggers. For example, the autonomous vehicle can default to rendering its current state in Block S110 but transition to rendering its next or future state in Block S132 once the autonomous vehicle has decided on a state change and is scanning a scene nearby for confirmation that the state change is proper to execute. Furthermore, upon reaching a crosswalk at an intersection (e.g., an uncontrolled, yield-controlled, stop-controlled, or signal-controlled intersection), the autonomous vehicle can execute Blocks S120, S122, and S124 to determine and render a representation of a state of the intersection on its rear-facing display. Similarly, upon approaching another vehicle stopped in a roadway or blocking a portion of the roadway ahead, the autonomous vehicle can communicate presence of this other vehicle ahead to drivers and vehicles behind the autonomous vehicle by updating its rear-facing display accordingly. In another example, when the autonomous vehicle determines that it is behind a larger vehicle (e.g., a truck) that may obscure view of the roadway ahead for drivers and passengers behind the autonomous vehicle, the autonomous vehicle can: download scan data broadcast by the truck or by a vehicle ahead of the larger vehicle; process these data to determine or predict a state of the roadway ahead of the larger vehicle; and update its display with this state of the roadway ahead in order to enable these drivers and passengers to better understand the roadway ahead despite visual obstruction by the larger vehicle.

The autonomous vehicle can implement similar methods and techniques to visually communicate information about its current state, its future state, and a scene behind the autonomous vehicle through a front-facing display arranged on the vehicle, such as to communicate most relevant information to pedestrians crossing a crosswalk ahead of the autonomous vehicle. For example, while parked at an intersection waiting for a pedestrian to cross a crosswalk directly ahead of the autonomous vehicle, the autonomous vehicle: can communicate to drivers and vehicles behind it that a pedestrian is in the crosswalk through the rear-facing display; and can communicate to the pedestrian whether another vehicle is approaching the intersection from behind the autonomous vehicle through the front-facing display.

The autonomous vehicle can therefore selectively render content on its forward- and rear-facing displays (e.g., left- and right-facing displays, etc.) in order to function as a "mirror" through which drivers, other vehicles, and/or pedestrians, etc. may ascertain a state (or "context") of a scene on an opposite side of the vehicle. When less relevant, the autonomous vehicle can then selectively render representations of its current state or selected future action on these displays. In particular, the autonomous vehicle can selectively execute Blocks of the method S100 to present visual information that requires limited cognitive load to comprehend and that is substantially (or most) relevant to drivers, other vehicles, and/or pedestrians, etc. nearby, thereby improving understanding of the autonomous vehicle, understanding of the scene around the autonomous vehicle for these drivers, other vehicles, and/or pedestrians, etc., and predictability of these drivers, other vehicles, and/or pedestrians, etc. for the autonomous vehicle.

3. Autonomous Vehicle

The autonomous vehicle can include: a suite of sensors configured to collect information about the autonomous vehicle's environment; one or more visual displays configured to render visual content related to the state of the autonomous vehicle, an intent of the autonomous vehicle, and/or a state of a road or intersection occupied by the autonomous vehicle to humans (e.g., pedestrians, drivers) outside of the vehicle and/or to other autonomous vehicles nearby; an audio driver (e.g., a speaker) configured to output audible sounds to influence humans nearby; and a controller configured to elect a future action or to make a navigational decision based on sensor streams read from the suite of sensors, to control the visual display(s) and/or the audio driver, and to navigate the autonomous vehicle accordingly over time, such as based on a deep learning and/or artificial intelligence model.

In one implementation, the autonomous vehicle includes one or more 360° LIDAR sensors arranged on the top of the autonomous vehicle, such as at each of the front and rear of the autonomous vehicle. Each LIDAR sensor can output one three-dimensional distance map—such as in the form of a 3D point cloud representing distances between one meter and 50 meters between the LIDAR sensor and external surface within the field of view of the LIDAR sensor—per rotation of the LIDAR sensor (i.e., once per scan cycle). The autonomous vehicle can additionally or alternatively include: a set of infrared emitters configured to project structured light into a field near the autonomous vehicle; a set of infrared detectors (e.g., infrared cameras); and a processor configured to transform images output by the infrared detector(s) into a depth map of the field. The autonomous vehicle can also include one or more color cameras facing outwardly from the front, rear, and left lateral and right lateral sides of the autonomous vehicle. For example, each camera can output a video feed containing a sequence of digital photographic images (or "frames"), such as at a rate of 20 Hz. Furthermore, the autonomous vehicle can include a set of infrared proximity sensors arranged along the perimeter of the base of the autonomous vehicle and configured to output signals corresponding to proximity of objects and pedestrians within one meter of the autonomous vehicle. The controller within the autonomous vehicle can thus fuse data streams from the LIDAR sensor(s), the color camera(s), and the proximity sensor(s) into one real-time scan (e.g., a 3D color map or 3D point cloud) of surfaces (e.g., surfaces of roads, sidewalks, road vehicles, pedestrians, etc.) around the autonomous vehicle per scan cycle. Alternatively, the autonomous vehicle can stitch digital photographic images—output by multiple color or infrared cameras arranged throughout the autonomous vehicle—exclusively into a scan image. The autonomous vehicle can also collect data broadcast by other vehicles and/or static sensor systems nearby and can incorporate these data into a scan image to determine a state of the scene around the vehicle and to elect subsequent actions.

The autonomous vehicle can then process each scan image into a state of a road or intersection occupied by the autonomous vehicle, identify other vehicles and/or pedestrians in each scan image, and elect a future action or other navigational decision accordingly. The autonomous vehicle is described below as extracting features from a scan image and serving audible and/or visual content through a display integrated into or mounted onto the autonomous vehicle based on these features. However, the autonomous vehicle can calculate a crossing confidence score based on features extracted from any other one or more individual or composite data streams output by sensors integrated into the autonomous vehicle.

The method S100 is described herein as executed by a ground-based passenger, commercial, or fleet vehicle. However, Blocks of the method S100 can be executed by a wheeled vehicle of any other type.

4. Displays

The autonomous vehicle can also include one or more visual displays configured to render (e.g., show, display) various content controlled by the autonomous vehicle to selectively indicate its current state, its next navigation action, or the state of a roadway nearby (e.g., an intersection ahead).

In one implementation shown in FIG. 1, the autonomous vehicle includes a rear-mounted display in the form of a cluster of light indicators mounted onto or integrated into the autonomous vehicle's rear decklid, rear bumper, taillights, rear parcel shelf, or rearview mirrors, etc. and facing outwardly from the rear of the vehicle. For example, the cluster of light indicators can include 50 multi-color light-emitting diodes (or "LEDs") distributed uniformly across a 6"-diameter circle and mounted in a substantially vertical orientation to the lateral center of a substantially vertical section of the rear decklid (e.g., trunklid, tailgate) of the autonomous vehicle. Blocks S110, S124, and S132 of the method S100 are described herein as executed through such a cluster of light indicators. The autonomous vehicle can also include a front-facing display in a similar format, such as integrated into a front grill of the autonomous vehicle.

In another example, the rear-mounted display includes: a first strip of multi-color LEDs integrated to the right rear taillight assembly and arranged substantially horizontal along a right turn indicator lamp within the right rear taillight assembly; and a second strip of multi-color LEDs integrated to the left rear taillight assembly and arranged substantially horizontal along a left turn indicator lamp within the left rear taillight assembly. The autonomous vehicle can also include a front-facing display similarly integrated into the autonomous vehicle's headlight assemblies.

In yet another example, the rear-mounted display includes a set of light indicators arranged in a rectangular pattern and integrated into a center rear brake light housing. In this implementation, the autonomous vehicle can control a state of each light indicator to produce particular patterns of light across the rear- (and forward-) facing display over time. However, the autonomous vehicle can include a rear-facing (and/or a front-facing) display including a cluster of any other number of light indicators of any other type.

In another implementation, the rear-facing display includes a digital display, such as a backlit e-ink display or a multi-color LED or LCD display.

In yet another implementation, the rear-facing display includes a roller board including: static visual content prepopulated (e.g., printed) across a scroll (or "tape") mounted on rollers spanning a backlit transparent window. The autonomous vehicle can thus drive the rollers to select positions corresponding to content on the scroll intended for display through the window over time. In this implementation, the rear-facing display can be mounted to a rear decklid, rear door or hatch, or rear tailgate, etc. of the vehicle, mounted to roof of the vehicle, mounted to or facing outwardly from a rear window of the vehicle, etc. In this implementation, the autonomous vehicle can include a similar front-facing display, such as mounted to the roof or front bumper of the autonomous vehicle.

In another implementation, the rear-facing display includes a visual light or laser light projector configured to project visual content onto a rear surface (e.g., a rear decklid or a rear window) of the autonomous vehicle or onto the road surface behind the autonomous vehicle. In this implementation, the autonomous vehicle can selectively project visual content—in one or more colors—directly onto a surface of the vehicle or onto the ground near the autonomous vehicle in order to communicate the autonomous vehicle's state, its next navigation action, and a state of a nearby scene in Blocks S110, S132, and S124, respectively. The autonomous vehicle can include a similar front-facing display, such as: arranged inside the autonomous vehicle and configured to project content on the front windscreen; arranged within the rearview mirror or on the roof of the autonomous vehicle and configured to project content onto the hood of the autonomous vehicle; or arranged in the front bumper of the autonomous vehicle and configured to project content onto the ground in front of the autonomous vehicle.

However, the rear- (and forward-) facing displays can be of any other type of display and can be similar or dissimilar in form or function. The autonomous vehicle can also include one or more displays mounted to or integrated into the top, left side, and/or right side, etc. of the autonomous vehicle. For example, the autonomous vehicle can control each display independently and can render: content relating to a scene ahead of the vehicle on the rear-facing display; content relating to a scene behind the vehicle on the front-facing display; content relating to a scene to the right of the vehicle on the left-facing display; and content relating to a scene to the left of the vehicle on the right-facing display in Block S124. Furthermore, the autonomous vehicle can include such a display arranged inside the vehicle and configured to present its current state, its future state, and/or the state of a scene nearby to an occupant inside the autonomous vehicle. However, the autonomous vehicle can include any other number and type of displays arranged on or integrated into the autonomous vehicle in any other way.

5. Vehicle State

Block S110 of the method S100 recites rendering a first representation of a current state of the vehicle on a rear-facing visual display arranged on the vehicle. Generally, in Block S110, the autonomous vehicle presents a visual representation of its current state on the rear-facing display (and/or the front-facing or other displays integrated into the autonomous vehicle), as shown in FIG. 1.

In one example, while moving forward along a roadway at a substantially constant speed, the autonomous vehicle can render—on each display—a static horizontal bar graph representative of the speed of the autonomous vehicle or an animated bar graph moving at a speed corresponding to the current speed of the vehicle. In this example, when the autonomous vehicle then initiates a turn, the autonomous vehicle can adjust the speed of the animated bar graph to correspond to the speed of the vehicle. The autonomous vehicle can also rotate the horizontal bar graph clockwise by a degree inversely proportional to a radius of a right-hand turn currently performed by the autonomous vehicle; or virtually rotate the horizontal bar graph counter-clockwise by a degree inversely proportional to a radius of a left-hand turn currently performed by the autonomous vehicle.

In a similar example, while decelerating toward an intersection, the autonomous vehicle can update its rear- and forward-facing displays to show icons indicating deceleration of the autonomous vehicle, such as icons animated at a rate directly proportional to the autonomous vehicle's rate of deceleration or at a rate inversely proportional to a predicted stopping distance behind a crosswalk at the intersection.

5.1 Driving Mode

Figure 5:
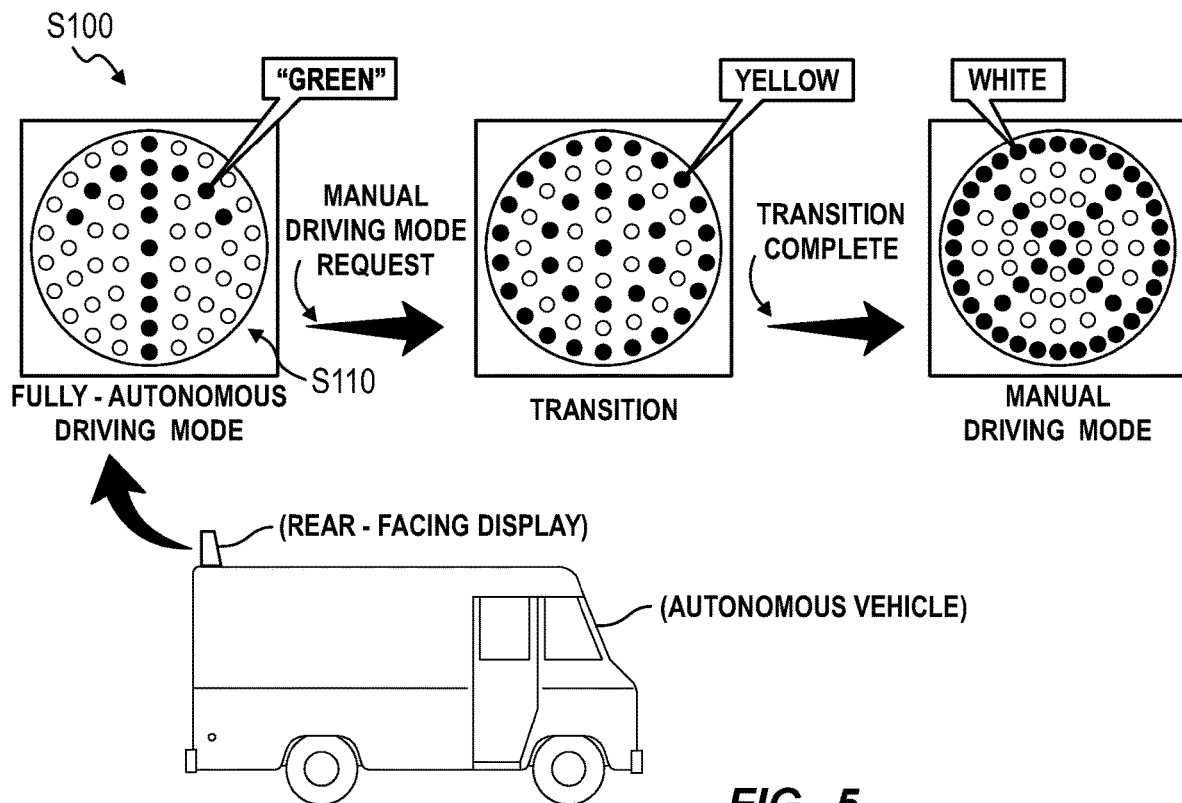
FIG. 5 is a flowchart representation of one variation of the method.

In one variation shown in FIG. 5, the autonomous vehicle indicates its current driving mode by updating a color (or "hue") rendered on the rear- and/or forward-facing displays. For example, the autonomous vehicle can transition a background rendered on each display: to a blue hue when entering a fully-autonomous driving mode; to an orange hue when entering a semi-autonomous driving mode; and to a white hue when entering a fully-manual driving mode.

In one implementation, while operating in the fully-autonomous driving mode and executing a preselected navigation action, the autonomous vehicle can render—on its displays—an indicator of this navigation action in a color associated with the fully-autonomous driving mode. For example, while maintaining a substantially constant forward speed, the autonomous vehicle can render on each display a static horizontal bar graph in the blue hue to indicate that the autonomous vehicle is currently traveling—and intends to continue traveling—at a constant speed and is currently operating in the fully-autonomous driving mode. However, in this implementation, the autonomous vehicle can transition into a manual driving mode responsive to an input by an occupant of the vehicle. For example, a cockpit of the autonomous vehicle can include a driver's seat, a steering wheel at the driver's seat, hand position sensors in the steering wheel, and a control interface for switching between the fully-autonomous driving mode and a manual driving mode. In this example, in response to receipt of an input to transition into the manual driving mode at the control interface followed by detection of two hands gripping the steering wheel, the autonomous vehicle can execute a routine to transition from the fully-autonomous driving mode to the manual driving mode. During this transition into the manual driving mode, the autonomous vehicle can update its displays to render a flashing yellow icon (e.g., a flashing yellow yield or warning icon); once in the manual driving mode, the autonomous vehicle can update its displays to depict a static, hashed white circle to indicate that the autonomous vehicle is in the manual driving mode, as shown in FIG. 5.

In another example, the autonomous vehicle can render an animated "blue" pinwheel to indicate that it is in fully-autonomous mode, that it is processing a scene nearby (or "thinking"), and that it is not yet ready to resume autonomous motion. In a similar example, the autonomous vehicle can update the display(s) to depict blinking or flashing lights to indicate a general hazard or to indicate that an autonomous driving system within the autonomous vehicle is malfunctioning.

In yet another example, when the autonomous vehicle is parked and in an off or "sleep" state, the autonomous vehicle can update the display(s) to indicate the autonomous vehicle's make, model, and/or autonomous driving capabilities. To further indicate that the autonomous vehicle is in the off or "sleep" state, the background of each display or icon representative of the autonomous vehicle's make, model, and/or autonomous driving capabilities can slowly pulsate in a gray hue. However, the autonomous vehicle can render icons of any other type, form and hue to indicate its driving mode and transitions between driving modes.

5.2 Emotional State

Figure 2:
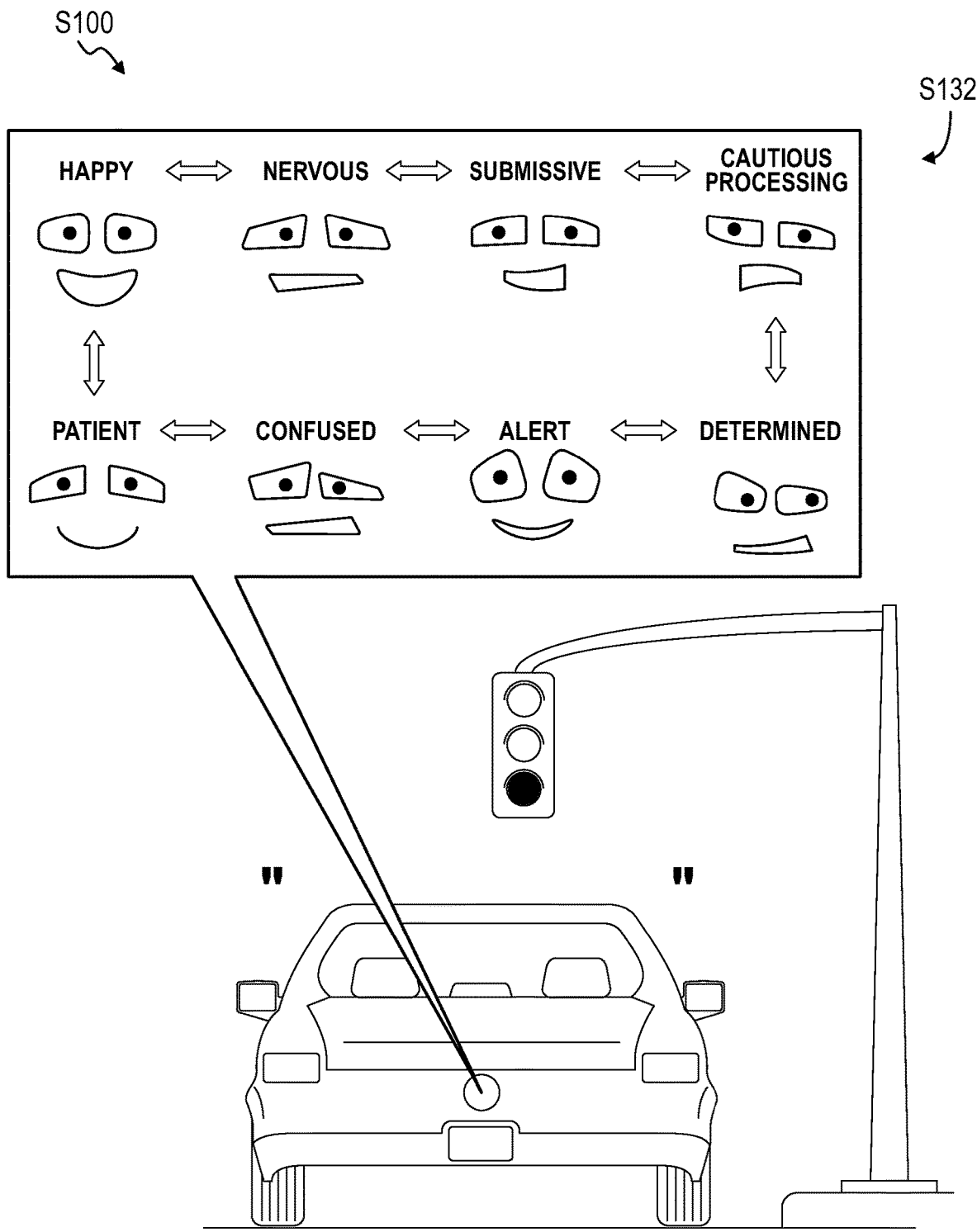
FIG. 2 is a flowchart representation of one variation of the method.

In one variation shown in FIG. 2, the autonomous vehicle can update the display with a graphical representation of various emotional states, such as associated with intentions encoded into the autonomous vehicle. For example, when occupying a four-way intersection and detecting multiple cars converging at the intersection, the autonomous vehicle can update the display with an emoji representing an alert or cautious emotion. The autonomous vehicle can also update the display with emojis representing: a happy emotion when the autonomous vehicle is cruising on a highway with minimal traffic; confused or "frazzled" emotion when a confidence score for a next navigation action is low; a patient emotion; a determined emotion; a submissive emotion when following another vehicle is heavy traffic; and/or a nervous emotion when executing an action associated with a low confidence score; etc.

6. Next Navigation Action

Block S130 of the method S100 recites in response to detecting a change in the state of the intersection, selecting a next navigation action for the vehicle; Block S132 of the method S100 recites, in preparation for executing the next navigation action, rendering a third representation of the next navigation action on the rear-facing visual display; and Block S134 of the method S100 recites executing the next navigation action. Generally, the autonomous vehicle determines its next navigation action in Block S132 based on data collected from a scene around the vehicle (e.g., from a sequence of scan images, as described above), updates one or more displays to indicate this next navigation action, and subsequently executes the next navigation action, as shown in FIG. 1. In particular, the autonomous vehicle can default to indicating its current state in Block S110 through one or more displays arranged on or integrated into the autonomous vehicle; when preparing to change its state (e.g., its direction or driving mode, etc.) or preparing to change its state by more than a threshold amount (e.g., accelerating or decelerating by more than 5% of its current speed), the autonomous vehicle can update the display(s) to indicate this change in Block S132.

In one implementation, the autonomous vehicle navigates along a preplanned path. Throughout operation, the autonomous vehicle can regularly scan images generated from data collected through various sensors arranged in the autonomous vehicle, as described above, to detect an object ahead of the autonomous vehicle most limiting to its advancement along the preplanned path (hereinafter an "object of interest"). For example, the autonomous vehicle can identify: a stopped vehicle; a stopped vehicle obstructing a portion of a roadway; a pedestrian in a crosswalk; a school bus unloading or loading students; a traffic accident; road traffic; or a traffic sign or signal indicating that the autonomous vehicle does not have right of way; etc. ahead of the autonomous vehicle. In Block S130, the autonomous vehicle can then transform detection of such an object of interest into a next navigation action, such as to remain stopped (e.g., for a red traffic signal ahead of the autonomous vehicle), to advance forward by limited distance (e.g., less than ten feet or less than one car length for heavy traffic or for a pedestrian in a crosswalk ahead of the autonomous vehicle), or to resume navigating along the preplanned path; the autonomous vehicle can repeat this process during each subsequent scan period, such as following generation of each subsequent scan image.

For example, once stopped at an intersection, the autonomous vehicle can index to a next navigational step specifying a right-hand turn along the preplanned path. In preparation for making this right-hand turn, the autonomous vehicle can update the rear-facing display to depict an animated arrow radially offset from a 0° position (e.g., vertical) by a distance inversely proportional to the radius of the upcoming turn elected by the autonomous vehicle and animated at a rate proportional to a rate of acceleration elected by the autonomous vehicle for the upcoming turn maneuver. In particular, the autonomous vehicle can associate the next navigation action with an acceleration rate through the intersection; and then render—on the rear- and forward-facing displays—an icon animated at a rate proportional to this acceleration rate and orientated according to a severity of the right turn action on the rear-facing visual display. In this example, the autonomous vehicle can also trigger the rear-facing display to render this animated arrow in a "red" hue to indicate that the intersection ahead of the autonomous vehicle is not yet safe to enter in Block S124 (described below); once the autonomous vehicle determines that an object of interest (e.g., a pedestrian or other road vehicle) has exited the intersection and/or determined that a traffic signal is indicating that the autonomous vehicle has the right of way in Block S122, the autonomous vehicle can update the rear-facing display to render this animated arrow in a "green" hue to indicate that the intersection ahead is clear to enter in Block S124.

In the foregoing example, the autonomous vehicle can: confirm its possession of right of way at the intersection based on a change in a state of traffic signage (e.g., a traffic light) detected over a sequence of scan images of the scene around the vehicle; select a next navigation action following the intersection in a current preplanned driving path in process at the autonomous vehicle in Block S132; project a path of the next navigation action onto a current scan image of the scene around the autonomous vehicle; and confirm that no pedestrian is located within or near the projected path of the next navigation action before initiating the next navigation action in Block S134. In particular, in Block S134, once the autonomous vehicle confirms that it has possession of right of way at the intersection (e.g., with at least a minimum threshold confidence score) and confirms lack of a pedestrian in the path of the next navigation action, the autonomous vehicle can accelerate forward to resume the current preplanned driving path, beginning with the next navigation action selected in Block S132. In this example, the autonomous vehicle can update its rear- and/or forward-facing displays to display an icon representative of the next navigation action once the next navigation action is selected in Block S132 and prior to (e.g., at least three seconds before) executing the next navigation action.

Therefore, in this implementation, the autonomous vehicle can regularly calculate and recalculate a confidence score for reliable (e.g., "safe," low-risk) execution of the next navigation action and execute the next navigation action when a calculated confidence score exceeds a preset threshold score. For example, while stopped at an intersection with a next right turn action elected, the autonomous vehicle can: record a sequence of scan images of the scene nearby; identify or estimate presence of pedestrians, other vehicles, and traffic signage within the sequence of scan images; calculate a low baseline confidence score for executing a right turn if the traffic signage indicates that the autonomous vehicle does not have right of way; increase the confidence score if the autonomous vehicle is positioned at the head of the intersection (and vice versa); increase the confidence score if no vehicle approaching from the left of the autonomous vehicle is detected within a distance of 100 yards (and vice versa); and increase the confidence score if no pedestrian is detected in a crosswalk in front of and to the right of the autonomous vehicle. In another example, while stopped at an intersection with a next right turn action elected, the autonomous vehicle can: record a sequence of scan images of the scene nearby; identify or estimate pedestrians, other vehicles, and traffic signage within the sequence of scan images; calculate a high baseline confidence score for executing a right turn if the traffic signage indicates that the autonomous vehicle does have right of way; and decrease the confidence score if a pedestrian is detected in a crosswalk in front of or to the right of the autonomous vehicle (and vice versa). The autonomous vehicle can repeat these calculations over time, remain stopped at the intersection while calculated confidence scores remain below a threshold score, and then execute the next right turn action once a calculated confidence score (or a sequence of calculated confidence scores) exceeds the threshold score. Furthermore, while calculated confidence scores for the next navigation action remain below the threshold score, the autonomous vehicle can continue to render a representation of the next navigation action on the rear- and/or forward-facing displays. Also, while delaying execution of the next navigation action, the autonomous vehicle can update the display(s) to indicate that the autonomous vehicle is currently processing the scene nearby and is not ready to resume motion, as shown in FIG. 2.

In another example, in preparation for accelerating from a stop straight through an intersection, the autonomous vehicle can update the display(s) to depict a vertical arrow animated at a rate proportional to a rate of acceleration elected by the autonomous vehicle for this upcoming action. In yet another example, when preparing to slow down, the autonomous vehicle can update the display(s) to depict a ball bouncing at a rate proportional to a deceleration rate predefined by the autonomous vehicle, proportional to a difference between the autonomous vehicle's current speed and target speed following this deceleration, or inversely proportional to a final target speed of the autonomous vehicle following this deceleration.

In the foregoing examples, the autonomous vehicle can exhibit a particular driving "personality"—such as an aggressive, moderate, or peaceable driving personality elected by the occupant of the autonomous vehicle, by a fleet manager, or by a situational awareness module within the autonomous vehicle—and the autonomous vehicle can thus visually indicate a degree of its anticipated aggression in a next navigation action through animation rates of arrows, balls, or an emoji rendered on the display(s).

In yet another example, when approaching an intersection, such as a stop-controlled intersection in which the autonomous vehicle follows another vehicle ahead, the autonomous vehicle can: detect that a vehicle ahead of the autonomous vehicle has pulled forward into the intersection (or pulled forward toward a crosswalk at the intersection; and then determine that its next navigation action is to creep forward to close a gap with the crosswalk ahead (or to close a gap with the vehicle ahead) in Block S130. In this example, because the total distance traversed by the autonomous vehicle during this next navigation action and the maximum velocity of the autonomous vehicle during the next navigation action may be substantially limited, the autonomous vehicle can update the rear-facing display to indicate that the autonomous vehicle will move forward slowly and by a short distance, such as by displaying a vertical arrow rendered in an "orange" hue and animated at a slow rate to indicate the autonomous vehicle will move forward slowly though the road ahead is not clear. Once a gap between the front of autonomous vehicle and the vehicle ahead is determined to be greater than a threshold distance (e.g., 10 feet), the autonomous vehicle can execute this next navigation action.

Furthermore, because the autonomous vehicle is aware of its future location—as specified in a preplanned trajectory in process at the autonomous vehicle—the autonomous vehicle can retrieve real-time data relating to its future locations, such as from other vehicles and/or static sensor systems near these future locations. The autonomous vehicle can then represent a state or scene at such a future location on the display prior to the autonomous vehicle's arrival at this location, thereby providing context for the autonomous vehicle's decisions between its current location and this future location to other drivers, passengers, and pedestrians nearby.

7. Intersection State to Trailing Vehicle

Block S110 of the method S100 recites detecting proximity of the vehicle to an intersection; Block S122 of the method S100 recites detecting a current state of the intersection ahead of the vehicle; and Block S124 of the method S100 recites rendering a second representation of the current state of the intersection on the rear-facing visual display. Generally, in Blocks S120, S122, and S124, the autonomous vehicle determines a state of a roadway ahead of the autonomous vehicle based on data collected from a scene ahead of the vehicle (e.g., from a sequence of scan images, as described above) and updates the rear-facing display to depict a representation of the state of this scene, as shown in FIG. 1. In particular, in Blocks S120, S122, and S124, the autonomous vehicle can visually inform drivers and other road vehicles behind the autonomous vehicle of the state of the roadway or of an intersection ahead of the autonomous vehicle through content rendered on the rear-facing display.

In one implementation, the autonomous vehicle: records a sequence of digital scan images of a scene around the vehicle through an optical sensor arranged on the vehicle, as described above; extracts a current state of the intersection ahead of the vehicle from this sequence of digital scan images in Block S122; and then renders—on the rear-facing visual display—an icon representative of the state of a traffic signal identified in the sequence of digital scan images in Block S124 to enable a driver or other vehicle behind the autonomous vehicle to quickly ascertain the state of the intersection and the traffic signal even if the intersection and/or traffic signal are visually obscured from the view of the driver or other vehicle. The autonomous vehicle can execute this process once fully stopped at an intersection. Alternatively, the autonomous vehicle can execute this process upon approach to an intersection. For example, while traveling along a roadway toward an intersection, the autonomous vehicle can: confirm its arrival at a location within a threshold distance of the intersection, such as by comparing a geospatial location of the autonomous vehicle to a virtual geospatial roadmap, in Block S120; extract information related to the intersection (e.g., a state of traffic signage at the intersection) from a sequence of digital scan images recorded by the autonomous vehicle during its approach; and then update the rear-facing display to render an icon or other image representative of this state of the intersection prior to the autonomous vehicle's arrival at the intersection in Block 124. Therefore, the autonomous vehicle can indicate—on one or more displays—the current state of an approaching intersection during deceleration of the autonomous vehicle toward the intersection in Block 124, such as in response to arrival of the vehicle within a threshold distance of the intersection.

In another implementation, the autonomous vehicle renders an icon indicating the current state of the intersection on the rear-facing visual display in response to arrival of the vehicle at a head of the intersection and detection of a second vehicle behind the autonomous vehicle. Generally, in this implementation, when the autonomous vehicle is stopped at an intersection (or at a crosswalk), the autonomous vehicle can detect—in one or a sequence of scan images—an object of interest ahead of the autonomous vehicle (e.g., a red traffic light, a pedestrian is present within a crosswalk facing the autonomous vehicle, or another vehicle occupying the intersection ahead of the autonomous vehicle) and determine whether another road vehicle is stopped behind the autonomous vehicle in Blocks S120 and S122. If both an object of interest obstructing the autonomous vehicle's forward motion and another vehicle behind the autonomous vehicle are thus identified in Block S122, the autonomous vehicle can update the rear-facing display to indicate the nature of this obstruction to the trailing vehicle. For example, if the autonomous vehicle detects a pedestrian in the crosswalk ahead of the autonomous vehicle, the autonomous vehicle can update the rear-facing display to render an image of a pedestrian (e.g., a "stick figure"), such as an animated image of a pedestrian moving at a rate corresponding to a velocity of a slowest pedestrian currently detected in the intersection. In this example, the autonomous vehicle can also update the rear-facing display to render the representation of the pedestrian in a color corresponding to the pedestrian's proximity to a target sidewalk, such as "red" when the pedestrian steps off of the sidewalk, "yellow" once the pedestrian passes fully in front of the autonomous vehicle, and green just as the pedestrian is about to reach the far sidewalk. Alternatively, the autonomous vehicle can render the representation of the pedestrian in a color corresponding to a right of way indicated by a traffic signal at the intersection or determined by the autonomous vehicle from a stop sign or yield sign at the intersection.

7.1 Lead Vehicle at Intersection

Figure 3:
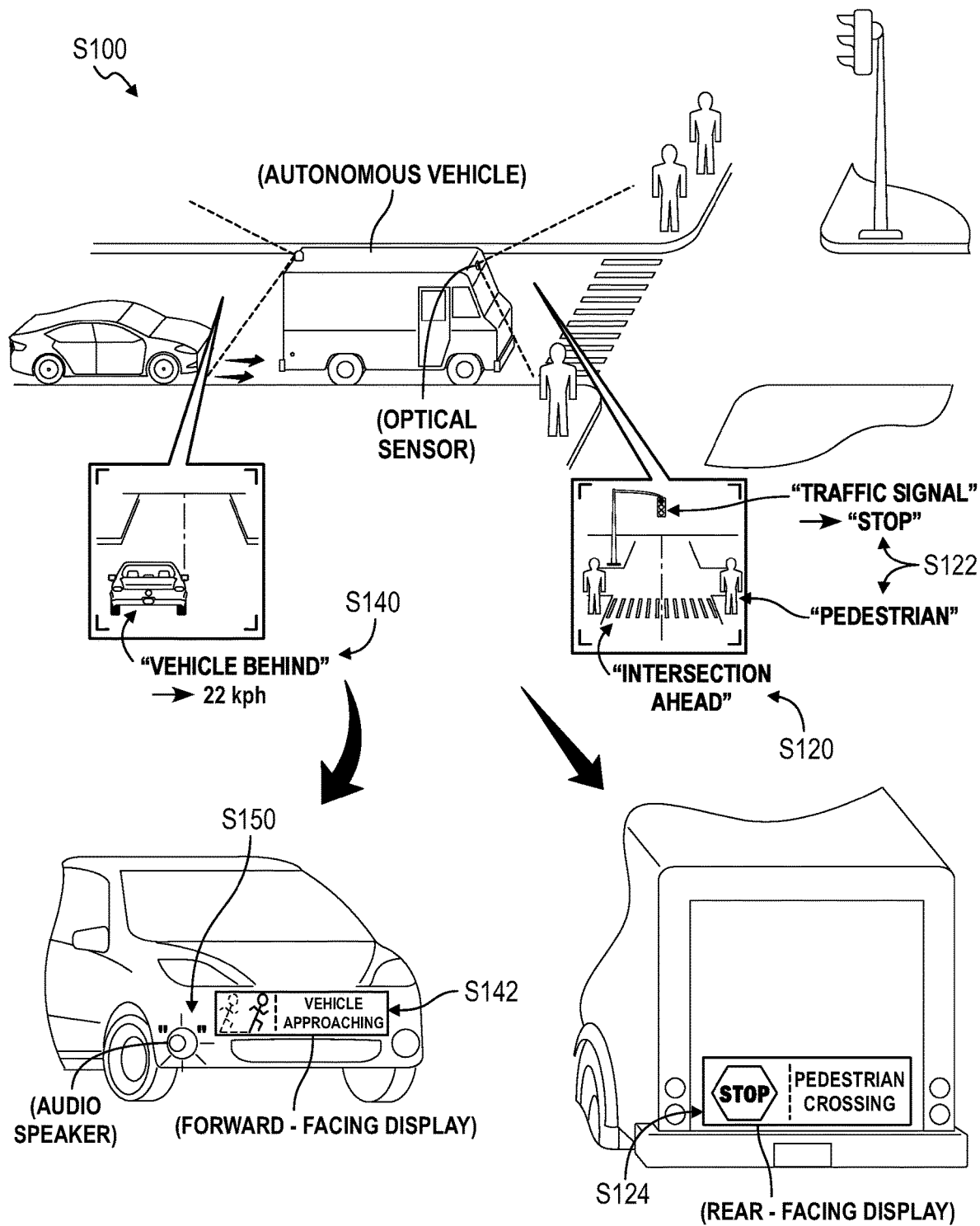
FIG. 3 is a flowchart representation of one variation of the method.

In one implementation, the autonomous vehicle can render—in response to arrival at a head of the intersection—the second icon indicating the current state of the intersection on the rear-facing visual display. In particular, the autonomous vehicle can execute Blocks S110, S130, S132, and S134 to indicate its current state and next navigation action when stopped behind another vehicle at an intersection (or behind another vehicle impeding traffic). However, when the autonomous vehicle determines that it has reached the front of an intersection (e.g., is immediately facing a traffic signal, stop sign, yield sign, and/or crosswalk), the autonomous vehicle can transition to visually communicating a state of the intersection ahead to drivers and vehicles behind the autonomous vehicle, as shown in FIG. 3. (The autonomous vehicle can also wirelessly broadcast these intersection state data to other vehicles or traffic systems nearby.) The autonomous vehicle can thus assume a more "master" or "active" role in communicating a context of a scene ahead to drivers and vehicles behind when the autonomous vehicle leads a line of vehicles at an intersection.

7.2 Behind Lead Vehicle at Intersection

Figure 6:
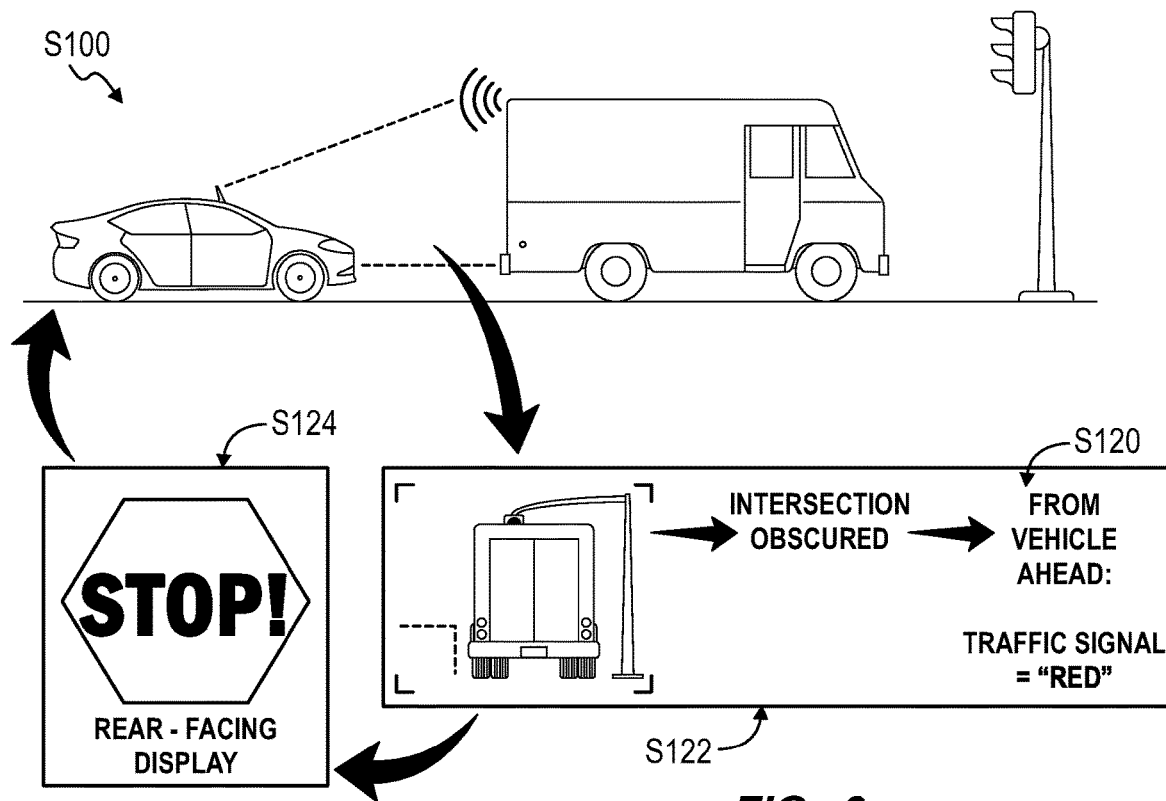
FIG. 6 is a flowchart representation of one variation of the method.

However, when the autonomous vehicle determines that it is stopped behind another vehicle at an intersection (or approaching an intersection while trailing another vehicle), the autonomous vehicle can display other scene-related data on its display(s). For example, the autonomous vehicle can detect a second vehicle stopped ahead of the autonomous vehicle at the intersection and then update the rear-facing display to render an icon indicating the presence of the second vehicle stopped ahead of the vehicle. In this example, if a second vehicle ahead of the autonomous vehicle is equipped with similar scene detection and recognition capabilities, the second vehicle can wirelessly broadcast a detected state of the intersection ahead; the autonomous vehicle can download this intersection state from the second vehicle and additionally or alternatively render—on its rear-facing display—an icon representing this intersection state, thereby enabling a driver and/or other vehicle behind the second vehicle and the autonomous vehicle to ascertain the state of the intersection ahead, as shown in FIG. 6. The autonomous vehicle can implement similar methods and techniques to collect data broadcast by other vehicles and/or static sensor systems nearby (e.g., a traffic signal or other infrastructure) and can update the rear- and/or forward-facing displays to render these data for drivers, passengers, and pedestrians, etc. outside of the vehicle to visually access addition data related to the scene around the vehicle.

7.3 Behind Stopped Vehicle

In another implementation, the autonomous vehicle can implement similar methods and techniques to detect a stopped vehicle in a roadway ahead of the autonomous vehicle and to visually represent the presence of this stopped vehicle on the rear-facing display. For example, if the autonomous vehicle detects a stopped vehicle with its hazard lights flashing ahead, the autonomous vehicle can update the rear-facing display to render: a flashing "red" representation of a car; a representation of a red car with flashing yellow hazard lights; or an image of towing rig with a car in tow; etc. to indicate that the car is stopped and unlikely to move. If the autonomous vehicle also determines that the stopped vehicle has pulled onto a shoulder by a sufficient distance that the autonomous vehicle may safely pass the stopped vehicle, the autonomous vehicle can update the rear-facing display: to show the representation of the stopped vehicle in yellow to indicate that the stopped vehicle may be passed under caution; and a curvilinear arrow showing the intended trajectory of the autonomous vehicle around the stopped vehicle. The autonomous vehicle can thus communicate the state of a scene ahead of the autonomous vehicle in Block S124 and its intended trajectory through the scene in Block S134 through the rear-facing display.

The autonomous vehicle can implement similar methods and techniques to indicate presence of stopped traffic ahead of the autonomous vehicle to another driver or vehicle behind the autonomous vehicle if the autonomous vehicle detects rapid deceleration of a vehicle ahead. For example, the autonomous vehicle can update the rear-facing display to show a rapidly flashing "red" representation of a line of stopped vehicles (and/or text) to indicate that the autonomous vehicle intends to rapidly decelerate and that the autonomous vehicle is approaching heavy traffic.

The autonomous vehicle can implement similar methods and techniques to update its display(s) to render a representation of the scene around the vehicle in response to other triggers, such as: detection of a vehicle rapidly decelerating ahead; detection of a vehicle rapidly accelerating ahead; detection of a pedestrian approaching a crosswalk ahead; detection of an object or obstacle in the roadway ahead of the autonomous vehicle; detection of a change in local weather (e.g., rain); etc. in order to inform other drivers and/or vehicles nearby of changing road conditions.

7.4 Combined Context and Action Icons

In one implementation, the autonomous vehicle oscillates between displaying a representation of the scene around the vehicle and displaying a representation of the elected next navigational action while the autonomous vehicle is stopped at an intersection. For example, the autonomous vehicle can cycle between rendering a first icon representative of the detected state of the intersection ahead of the autonomous vehicle (e.g., right of way at the intersection, presence of a pedestrian at the intersection, approach of other vehicles entering the intersection, etc.) and a second icon representative of the next navigation action (e.g., a right turn, a left turn, or a through action) once per five-second interval. Alternatively, the autonomous vehicle can render both a representation of the state of the intersection and a representation of the next navigation action simultaneously on the rear- and/or front-facing displays while approaching and/or stopped at an intersection.

The autonomous vehicle can implement similar methods and techniques to cycle between displaying a representation of the state of the intersection and a representation of the next navigation action or can display these representations simultaneously while executing the next navigation action in Block S134.

However, the autonomous vehicle can implement any other methods or techniques to visually communicate a state of a roadway ahead of the autonomous vehicle to other road vehicles behind the autonomous vehicle.

8. Pedestrian Visuals

As shown in FIG. 3, one variation of the method includes: Block S140, which recites extracting a current state of the scene behind the vehicle from the digital scan image; and Block S142, which recites rendering a fourth representation of the current state of the scene behind the vehicle on a forward-facing visual display arranged on the vehicle. Generally, in Blocks S140 and S142, the autonomous vehicle can implement the foregoing methods and techniques to identify a pedestrian near the vehicle, to indicate visually the presence of the pedestrian that the autonomous vehicle has detected, and/or to provide additional visual guidance to the pedestrian navigating a nearby intersection.

8.1 Pedestrian Presence

Figure 4:
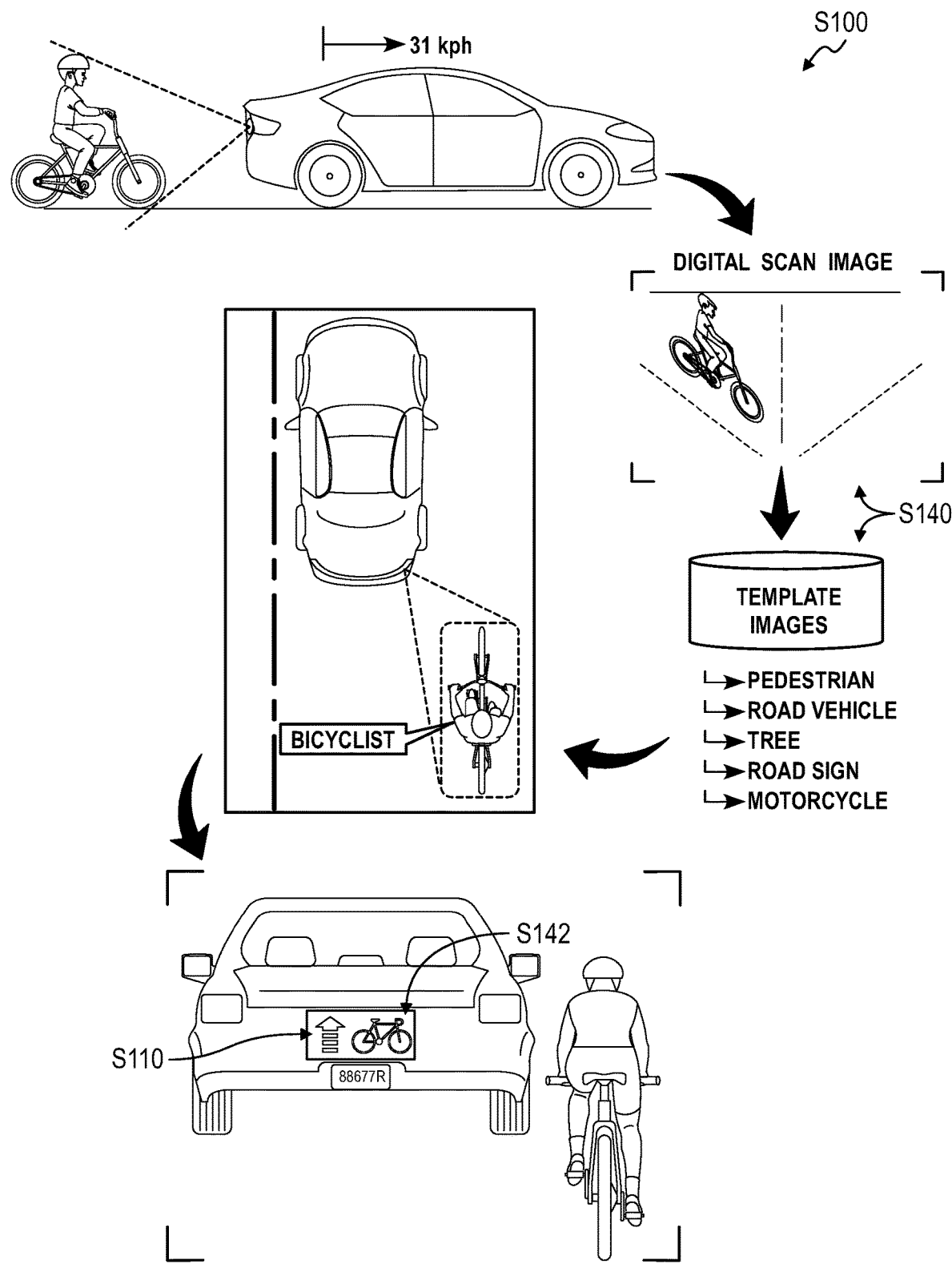
FIG. 4 is a flowchart representation of one variation of the method.

In one implementation, the autonomous vehicle: records a sequence of digital scan images of a scene around the vehicle through an optical sensor arranged on the vehicle; implements methods and techniques described above (e.g., object recognition) to detect proximity of a pedestrian to the autonomous vehicle and a relative position of the pedestrian to the vehicle from the sequence of digital scan images; identifies a particular display, in a set of displays on the vehicle, in a field of view of the pedestrian based on the position of the pedestrian relative to the autonomous vehicle; and then renders an icon or other visual content—on the particular visual display—indicating that the autonomous vehicle has detected the pedestrian. For example, while autonomously navigating along a roadway at a substantially constant speed, the autonomous vehicle can detect—through a sequence of scan images—a bicyclist near or approaching the right-rear corner of the autonomous vehicle; the autonomous vehicle can then determine that the rear-facing display is within the field of view of the bicyclist and update the rear-facing display to render an icon or other graphical content indicating that the autonomous vehicle has detected the pedestrian, such as a flashing green bicycle graphic, as shown in FIG. 4. In this example, the autonomous vehicle can also delay future right-hand turns off of this roadway until the bicyclist has passed the autonomous vehicle or is no longer within a threshold distance of the autonomous vehicle. Furthermore, once the bicyclist has passed the autonomous vehicle or is no longer within a threshold distance of the autonomous vehicle, the autonomous vehicle can remove the bicyclist-related icon from the rear-facing display.

In another example, the autonomous vehicle can implement similar methods and techniques to: detect a pedestrian ahead of the autonomous vehicle; to determine that the forward-facing display is in the field of view of the pedestrian; and to update the forward-facing display with an icon or other graphical content representative of a pedestrian, such as a yellow flashing silhouette of a human, to indicate to a pedestrian crossing a crosswalk ahead of the autonomous vehicle that the autonomous vehicle has detected her presence. In this example, the autonomous vehicle can also position the pedestrian-related icon on the forward-facing display according to the position of the pedestrian relative to the autonomous vehicle and can move the pedestrian-related icon across the forward-facing display as the user passes the autonomous vehicle, thereby indicating to the pedestrian that the autonomous vehicle recognizes both her presence and her position relative to the autonomous vehicle.

8.2 Pedestrian Guidance

The autonomous vehicle can implement similar methods and techniques to visually communicate the autonomous vehicle's intent and/or a state of the roadway behind the autonomous vehicle to other drivers, road vehicles, or pedestrians ahead of the autonomous vehicle through a front-facing display integrated into or installed on the autonomous vehicle. In particular, the autonomous vehicle can: extract a current state of the scene behind the autonomous vehicle from a sequence of digital scan images recorded through optical sensors arranged on the autonomous vehicle; and then render graphical content—on a forward-facing visual display arranged on the vehicle—representing the current state of the scene behind the vehicle, thereby enabling pedestrians near the front of the vehicle to better understand a scene behind (and possibly visually obscured by) the autonomous vehicle by viewing the autonomous vehicle directly, as shown in FIG. 3.

In one example, the autonomous vehicle: detects a pedestrian within a crosswalk (e.g., by analyzing one or a sequence of scan images); and then updates the front-facing display to indicate that the autonomous vehicle has detected the pedestrian and intends to remain stopped for the pedestrian, such as by rendering a "green" or "white" representation of a pedestrian on the front-facing display (or green "OK" signage on the front-facing display, as shown in FIG. 1) in Block S124. The pedestrian can thus quickly, visually access the front-facing display to confirm that the autonomous vehicle has identified her and that the autonomous vehicle is safe to walk in front of. In this example, the autonomous vehicle can implement methods and techniques described above to also indicate the presence of the pedestrian to drivers and vehicles behind the autonomous vehicle.

However, in the foregoing example, if the autonomous vehicle determines—from a sequence of scan images—that another vehicle behind the autonomous vehicle is beginning to pull around the autonomous vehicle and/or identifies another vehicle approaching the crosswalk at a speed suggesting that the second road vehicle may not stop for the pedestrian, the autonomous vehicle can update the front-facing display to indicate that the crosswalk ahead of the autonomous vehicle may not be safe for the pedestrian to cross, such as by updating the front-facing display to show a flashing "yellow" yield sign to suggest that the crosswalk may not be safe for the pedestrian to cross. The pedestrian may quickly, visually assess the front-facing display and either retreat to a nearest sidewalk or to retreat to a section of the crosswalk directly ahead of the autonomous vehicle for safety from the approaching vehicle accordingly.

In a similar example shown in FIG. 3, the autonomous vehicle can detect—in one or a sequence of digital scan images—a second vehicle approaching the intersection from behind the autonomous vehicle and a pedestrian ahead of the autonomous vehicle. The autonomous vehicle can then render graphical content indicating both the presence of the pedestrian ahead of the autonomous vehicle and the state of the intersection ahead (e.g., the traffic signal) on the rear-facing visual display in order to visually communicate potential hazards to the approaching vehicle. Because the autonomous vehicle detected the pedestrian ahead of the vehicle, the autonomous vehicle can also render graphical content representative of the approaching second vehicle on the forward-facing display in order to visually communicate to the pedestrian potential hazards of entering or remaining in the intersection. In this example, the autonomous vehicle can also estimate a speed of the second vehicle as it approaches the intersection; and graphical content indicating the second vehicle's approach and rendered on the forward-facing display can be animated or can include static content representative of this speed.

The autonomous vehicle can implement similar methods and techniques to render—on a display mounted on one side of the autonomous vehicle—a state of the intersection on an opposite side of the autonomous vehicle in Block S124; pedestrians standing at sidewalks or in crosswalks facing the autonomous vehicle can thus quickly access visual data reddened on these side-facing displays to determine a state of the intersection.

In one variation, the front-facing display includes a light projection system. In this variation, upon reaching an intersection, the autonomous vehicle can implement methods and techniques described above to identify a pedestrian—currently in the intersection or standing on a sidewalk ramp near a crosswalk—in one or a sequence of scan images. The autonomous vehicle can then control the light projection system to project light onto the pedestrian or onto a road surface adjacent (e.g., around the pedestrian to indicate to the pedestrian that the autonomous vehicle is aware of her. For example: the light projection system can include a laser projector mounted in the nose of the autonomous vehicle; the autonomous vehicle can activate the laser projector and manipulate outputs of the laser projector to project a rectangular box or a circle of green light around the pedestrian's feet to indicate to the pedestrian that the autonomous vehicle has detected her and to illuminate the pedestrian for other drivers and vehicles nearby; and update the position of the projected light box or circle to follow the pedestrian as the pedestrian moves across a crosswalk ahead of the autonomous vehicle. In the foregoing example, the autonomous vehicle can also update the rear-facing display to indicate to other drivers and vehicles behind the autonomous vehicle that a pedestrian is present in the intersection, as described above.

The autonomous vehicle can implement similar methods and techniques: to detect motorcycles, bicycles, powered and unpowered scooters, wheelchairs, etc. near the autonomous vehicle: to visually indicate that the autonomous vehicle has detected these other vehicles; to indicate the autonomous vehicle's intent to yield to occupants of these other vehicles; to communicate a state of a nearby intersection to occupants of these other vehicles; etc. through the front-facing display. The autonomous vehicle can also implement methods and techniques described above to communicate presence of such smaller vehicles to larger road vehicles and/or their drivers behind the autonomous vehicle through the rear-facing display.

9. Audio

As shown in FIG. 3, one variation of the method further includes Block S150, which recites replaying an audio track through an audio speaker arranged on the vehicle in conjunction with rendering the third representation of the next navigation action on the rear-facing visual display, wherein the audio track includes an audible sound configured to draw attention to the forward-facing visual display. Generally, in this variation, the autonomous vehicle can accompany content rendered on a display of the autonomous vehicle (or a change in content rendered on the autonomous vehicle) with replay of an audio track in order to prompt a driver in another vehicle, a pedestrian, a bicyclist, or other human nearby to look toward the autonomous vehicle and to digest visual content rendered on the display. For example, upon detecting a pedestrian nearby and rendering pedestrian-related content on the forward-facing display accordingly, the autonomous vehicle can also replay an audio track—such as an electronic notification sound byte or a short siren—through an external, forward-facing audio speaker integrated into the autonomous vehicle in order to prompt the pedestrian to look toward the autonomous vehicle and the forward-facing display. In a similar example, upon detecting a bicyclist near the vehicle and rendering bicyclist-related content on a nearby display, the autonomous vehicle can replay an audio track through an external audio speaker directed toward the detected location of the bicyclist in order to prompt the bicyclist to look toward the autonomous vehicle and the display.

However, the autonomous vehicle can replay audio of any other type and based on any other content rendered on a display on the autonomous vehicle or in response to a change in content rendered on a display on the autonomous vehicle.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

What is claimed is:

1. A method comprising:
   obtaining scan data of a field of view of a vehicle;
   detecting a current state of a scene located in a first direction in the field of view of the vehicle, the current state of the scene detected based on the scan data; and
   rendering content based on the scan data, the content corresponding to the current state of the scene located in the first direction in the field of view of the vehicle, the content presented external to the vehicle in a second direction different from the first direction.

2. The method of claim 1, wherein the content is presented based on a detection of a trigger.

3. The method of claim 2, wherein the trigger includes the vehicle being located within a threshold distance of the scene.

4. The method of claim 3, wherein the trigger further includes at least one of a second vehicle or a pedestrian being located in the second direction.

5. The method of claim 1, wherein the current state of the scene includes a presence of at least one of a second vehicle or a pedestrian.

6. The method of claim 1, wherein the content is selectively rendered.

7. A system comprising:
   at least one sensor configured to capture scan data of a field of view of a vehicle;
   at least one processor configured to detect a current state of a scene located in a first direction in the field of view of the vehicle, the current state of the scene detected based on the scan data; and
   a display configured to present content external to the vehicle in a second direction different from the first direction, the content corresponding to the current state of the scene.

8. The system of claim 7, wherein the scene includes at least one of an intersection, a roadway, or a crosswalk.

9. The system of claim 7, wherein the first direction corresponds to a first side of the vehicle and the second direction corresponds to a second side of the vehicle opposite the first side.

10. The system of claim 9, wherein the first side is a front side, a rear side, a left side, or a right side.

11. The system of claim 7, wherein the content includes an image of the scene.

12. The system of claim 7, wherein the content includes a pattern of light.

13. The system of claim 7, wherein the content indicates at least one object of interest.

14. One or more tangible non-transitory computer-readable storage media storing computer-executable instructions for performing a computer process on a computing system, the computer process comprising:
   obtaining scan data of a field of view of a vehicle;
   detecting a current state of a scene located in the field of view of the vehicle, the current state of the scene detected based on the scan data;
   selectively rendering content corresponding to the current state of the scene located in the field of view of the vehicle; and
   communicating the content to at least one display for presentation.

15. The one or more tangible non-transitory computer-readable storage media of claim 14, wherein the content corresponds to an identification of a presence of an object of interest in the scene.

16. The one or more tangible non-transitory computer-readable storage media of claim 14, wherein the content corresponds to a traffic signal state of a traffic signal in the scene.

17. The one or more tangible non-transitory computer-readable storage media of claim 14, wherein the content is selectively rendered based on at least one of: a proximity of an object of interest to an element in the scene; a velocity of the object of interest; a right of way of the object of interest.

18. The one or more tangible non-transitory computer-readable storage media of claim 17, wherein the content is selectively rendered by animating the content at a rate corresponding to the velocity of the object of interest in the scene.

19. The one or more tangible non-transitory computer-readable storage media of claim 17, wherein the element in the scene is an end of a crosswalk.

20. The one or more tangible non-transitory computer-readable storage media of claim 17, wherein the right of way of the object of interest is relative to the vehicle.

21. The method of claim 1, wherein the content is sent to a second vehicle for display.

22. The method of claim 21, wherein the scene is obstructed in a second field of view of the second vehicle.

\* \* \* \* \*